United States Patent [19]

Sakai et al.

[11] 4,204,745

[45] May 27, 1980

[54] OPTICAL FIBER

[75] Inventors: Junichi Sakai; Tatsuya Kimura, both of Tokorozawa, Japan

[73] Assignee: Nippon Telegraph and Telephone Public Corp., Tokyo, Japan

[21] Appl. No.: 914,548

[22] Filed: Jun. 12, 1978

[30] Foreign Application Priority Data

Jun. 10, 1977 [JP] Japan .................. 52/68513

[51] Int. Cl.² .............................................. G02B 5/14
[52] U.S. Cl. ............................................. 350/96.31
[58] Field of Search ............................... 350/96.31

[56] References Cited

U.S. PATENT DOCUMENTS

| 3,904,268 | 9/1975 | Keck et al. | 350/96.31 |
| 4,006,962 | 2/1977 | Olshansky | 350/96.31 |
| 4,057,320 | 11/1977 | Marcatilli | 350/96.31 |

OTHER PUBLICATIONS

R. Olshansky and D. Keck, "Pulse Broadening in Graded-Index Optical Fibers", Applied Optics, Feb. 1976, vol. 15, No. 2 pp. 483–491.

*Primary Examiner*—Rolf G. Hille
*Attorney, Agent, or Firm*—Armstrong, Nikaido, Marmelstein & Kubovcik

[57] ABSTRACT

In a graded index optical fiber whose refractive index distribution (n) at the radial length r is given by $$n = \begin{cases} n_O(1 - \Delta(r/a)^\alpha), & 0 \leq r \leq a, \\ n_O(1 - \Delta) = n_e, & r \geq a \end{cases}$$

where ($n_0$) is the refractive index at the core axis, (a) is the core radius, $\alpha$ is a power exponent, $n_e$ is the refractive index of the cladding, and $\Delta = (n_0 - n_e)/n_0$, said exponent $\alpha$ and the normalized frequency $v\ (=(2\pi a n_0/\lambda)\sqrt{2\Delta}$, $\lambda$ is the wavelength) are determined so that the group delay of the fundamental mode is equal to that of the first higher order mode. In particular, the value of $\alpha$ is determined in the range $3.2 \leq \alpha \leq 6.0$. Thus, the optical fiber with both a broad bandwidth and a large core diameter can be provided. A large core diameter optical fiber facilitates the connection or the splicing of two optical fibers.

6 Claims, 9 Drawing Figures

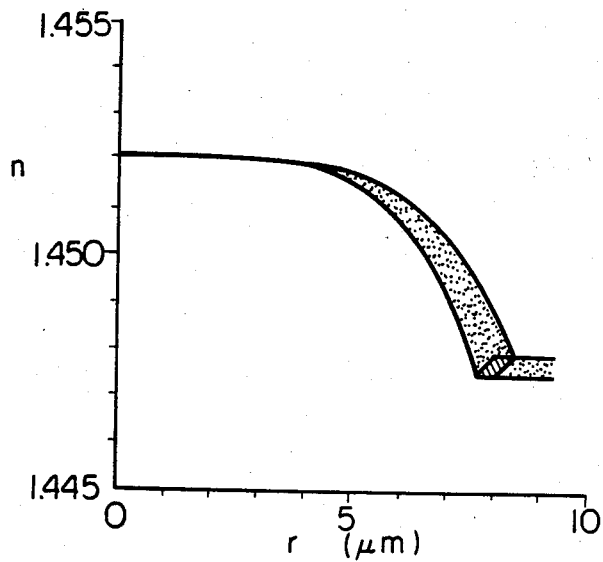
Fig. 5
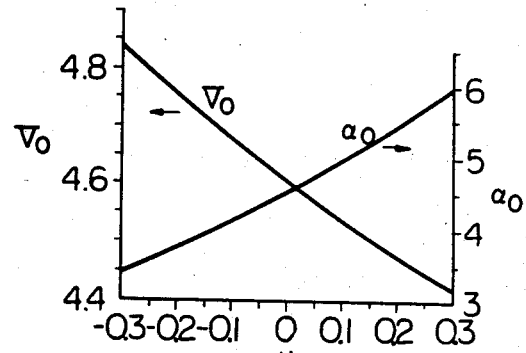
Fig. 6
Fig. 7
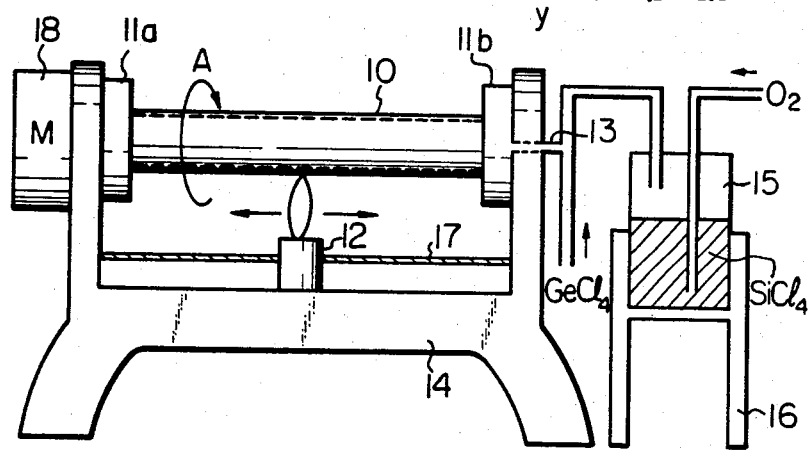

OPTICAL FIBER

BACKGROUND OF THE INVENTION

The present invention relates to the structure of an optical fiber for optical communication.

An optical fiber is the communication line in which an optical signal is transmitted through the total reflection of optical energy. It is composed of a cladding of uniform refractive index and a core with larger refractive index than that of the cladding. An optical fiber whose refractive index changes stepwise at the core-cladding interface as shown in FIG. 1, is called a step index optical fiber. An optical fiber whose index changes smoothly in the core regions as shown in FIG. 2, is called a graded index optical fiber. In FIGS. 1 and 2, the abscissa shows the radial length from the core center, and the ordinate shows a refractive index.

In FIG. 2, the refractive index (n) in the core region satisfies, $$n = n_0 \{1 - (r/a)^\alpha\}, \qquad (1)$$

where ($n_0$) is the refractive index at the core axis, (r) is the radial length from the core center, (a) is the core radius, $\alpha$ is a power exponent, and $\Delta$ is the relative index difference between core and cladding. Here, $\Delta$ is defined by $$\Delta = (n_0 - n_e) / n_0, \qquad (2)$$

where $n_e$ is the refractive index of the cladding, and it should be appreciated that the refractive index of the cladding is constant throughout the entire cladding region.

It has been well known that there are two kinds of optical fibers which are classified according to the propagating mode number in the fiber. One is called a single mode optical fiber in which only a single mode ($LP_{01}$ mode) propagates. Although a single mode fiber has the advantage of broad bandwidth (for instance, the bandwidth is larger than 30 $GH_z$.Km), it has the disadvantage that the connection or splicing of fibers is very difficult since the core diameter is very small (for instance, the core diameter is several $\mu$m). The other type of optical fiber is called a multimode optical fiber in which a plurality of modes propagate in the fiber. The multimode optical fiber has the advantage of large core diameter (for instance, several tens $\mu$m). However, a multimode optical fiber has the disadvantage of narrow bandwidth since the group delays of modes are different. In discussing the characteristics of an optical fiber, the normalized frequency (v) defined by Eq. (3) is well utilized.

$$v = \frac{2\pi a n_0}{\lambda} \sqrt{2\Delta}, \qquad (3)$$

where $\lambda$ is the wavelength, and the condition $\Delta < 1$ must be satisfied.

Theoretically speaking, an optical fiber having the value (v) smaller than 2.405 operates as a single mode optical fiber, and that having the value (v) equal to or larger than 2.405 operates as a multimode optical fiber, as far as a step index optical fiber is concerned. For a single mode optical fiber with a given v, a possible means to get a larger core radius (a) is to decrease the value of $\Delta$. Said means is derived from Eq. (3). Although the above means has been tried, the total performance of the resultant optical fiber is not satisfactory because a new undesirable disadvantage such as an increase of bending loss is generated. On the other hand, a multimode optical fiber can have a value (v) larger than several tens, but as mentioned above, the bandwidth of a multimode optical fiber is narrow. Although the value of $\alpha$ is designed to be approximately 2 in order to obtain a wider bandwidth in a graded index optical fiber, the bandwidth thus obtained is still unsatisfactory.

SUMMARY OF THE INVENTION

It is an object, therefore, of the present invention to overcome the disadvantages and limitations of a prior optical fiber by providing a new and improved optical fiber.

Another object of the present invention is to provide an improved optical fiber which can have both the wide band characteristics and a large core diameter.

The above and other objects are attained by a graded index optical fiber in which the power exponent $\alpha$ and the normalized frequency v is so designed that the group delay of the fundamental mode is equal to that of the first higher order mode. According to the preferred embodiment of the present invention, said power exponent $\alpha$ satisfies the inequality;

$$3.2 \leq \alpha \leq 6$$

BRIEF DESCRIPTION OF THE DRAWINGS

The foregoing and other objects, features, and attendant advantages of the present invention will be appreciated as the same become better understood by means of the following description and accompanying drawings wherein;

FIG. 6 represents curves showing the optimum values of $\alpha$ and v when the value of $\Delta$ depends upon the wavelength, and FIG. 7 shows the apparatus for manufacturing the optical fiber according to the present invention.

DESCRIPTION OF THE PREFERRED EMBODIMENTS

The basic principle of the present invention is as follow.

Figure 1:
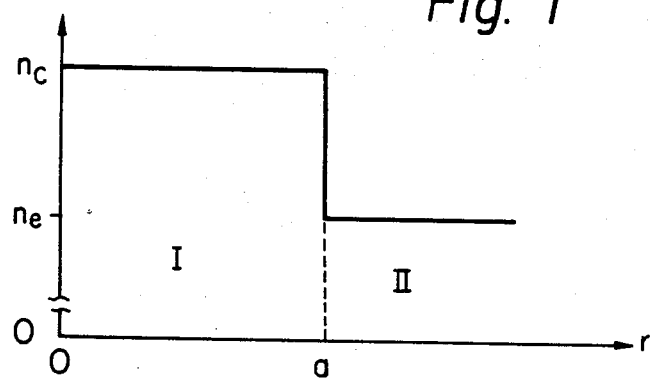
FIG. 1 represents the curve showing the relationship between the refractive index and the radial length from core axis in a prior step index optical fiber.
Figure 2:
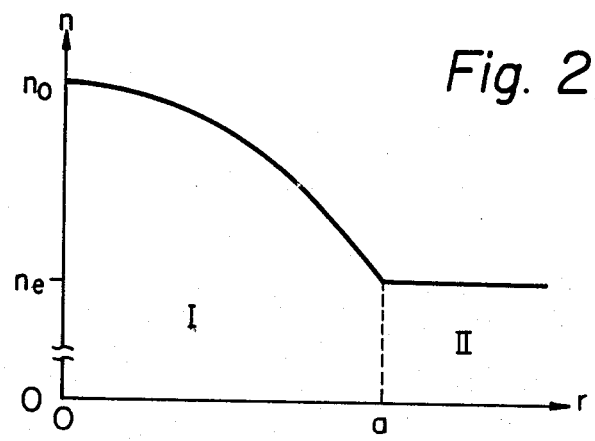
FIG. 2 represents the curve showing the relationship between the refractive index and the radial length from core axis in a present graded index optical fiber.

(1) A graded index fiber shown in FIG. 2 is utilized.

(2) The fundamental mode ($LP_{01}$) and the first higher order mode ($LP_{11}$) are propagated simultaneously.

(3) The value of the normalized frequency (v) is designed as large as possible, so long as the value (v) is less than the cut-off frequency of the second higher order mode ($LP_{21}$).

(4) The refractive index distribution in the core region is designed such that the group delay of the $LP_{01}$ mode coincides with that of the $LP_{11}$ mode. The refractive index distribution of an optical fiber according to the present invention are shown by $$n = \begin{cases} n_0\{1 - \Delta(r/a)^\alpha\}, & 0 \leq r \leq a \\ n_0(1 - \Delta) = n_c, & r \geq a \end{cases} \quad (4)$$

where $(n_0)$ is the refractive index at the core axis, (a) is the core radius, $\Delta$ is the relative index difference defined by Eq. (2), $n_e$ is the refractive index of cladding, and $\alpha$ is a power exponent.

In the above optical fiber, the group delay $\tau_g$ for the fundamental mode ($LP_{01}$ mode) or the first higher order mode groups ($LP_{11}$, or $HE_{21}$, $TE_{01}$, and $TM_{01}$ modes) is expressed in the following formulae in which the power series up to the first order of $\Delta$ is taken into consideration (K. Okamoto and T. Okoshi, IEEE Jrans. MTT, Vol. 24, No. 7(1976)416.)

$$\tau_g = \frac{n_g}{c} \cdot \frac{1 - \Delta(1 + y/4)QX}{(1 - 2X\Delta)^{\frac{1}{2}}} \quad (5)$$

$$Q = \frac{4}{\alpha + 2}\left\{1 + \frac{\alpha(1 - \xi)}{2X(1 - \xi/\zeta)}\right\} \quad (6)$$

$$X = \frac{\alpha + 2}{\alpha} \cdot \frac{u^2}{v^2}, \quad (7)$$

$$\xi = \frac{\{K_1(w)\}^2}{K_0(w) K_2(w)}, \quad (8)$$

$$\zeta = \frac{\{J_1(u)\}^2}{J_0(u) J_2(u)}, \quad (9)$$

where c is the light velocity, $n_g$ is the fiber axis group index expressed as $$n_g = n_0 - \lambda \frac{dn_0}{d\lambda},$$

and y is the profile dispersion parameter defined by Eq. (15). And u, w and v are parameters showing the characteristics of the optical fiber as explained below. Further, J denotes the Bessel function of the first kind, and K denotes the modified Bessel function of the first kind. Equations (10) and (11) are satisfied concerning u, w and v in this case.

$$\frac{uJ_0(u)}{J_1(u)} + \frac{wK_0(w)}{K_1(w)} + \frac{(1 - 1/\xi)w^2}{\alpha + 2} = 0. \quad (10)$$

$$v^2 = \frac{\alpha + 2}{\alpha} u^2 + w^2 = \left\{\frac{2\pi n_0 a}{\lambda} \sqrt{2\Delta}\right\}^2, \quad (11)$$

where v is the normalized frequency as defined before. From Eqs. (10) and (11), the constants (u,w) for the $LP_{01}$ or $LP_{11}$ mode at a given normalized frequency can be solved. The result is substituted into Eqs. (5) through (9) to obtain the group delay difference $\tau_d$.

Figure 3:
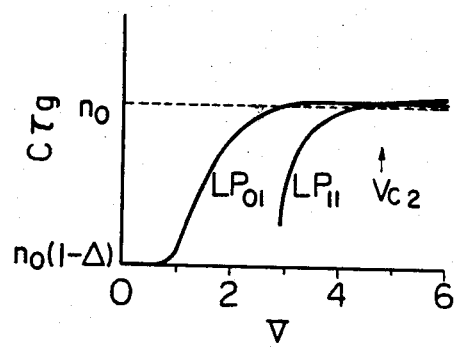
FIG. 3 represents curves showing the group delays of both modes.
Figure 4A:
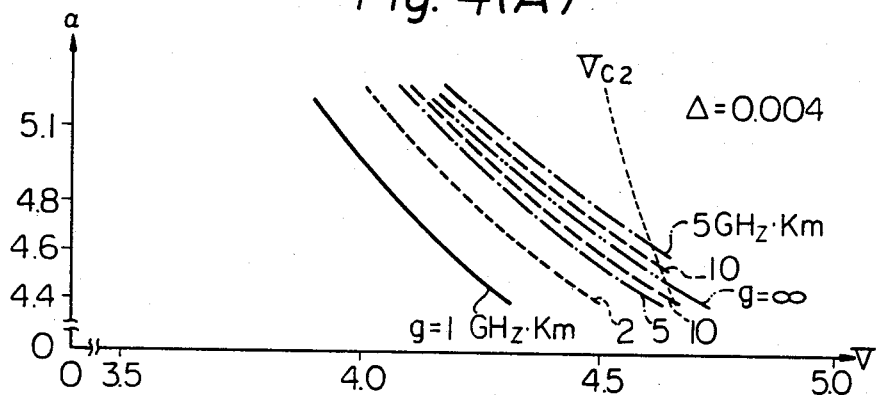
FIGS. 4(A), 4(B), and 4(C) represent curves showing the relationship between the normalized frequency (v) and the power exponent ($\alpha$) for each value of ($\Delta$), FIG, 5 represents the curve showing the refractive index distribution of the present optical fiber.
Figure 4B:
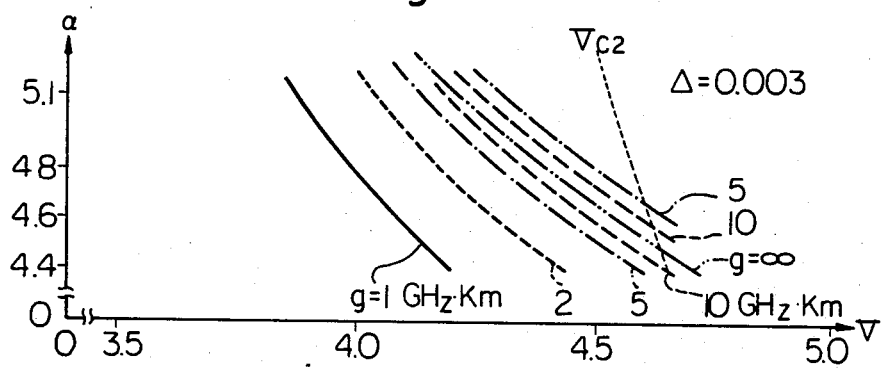
Figure 4C:
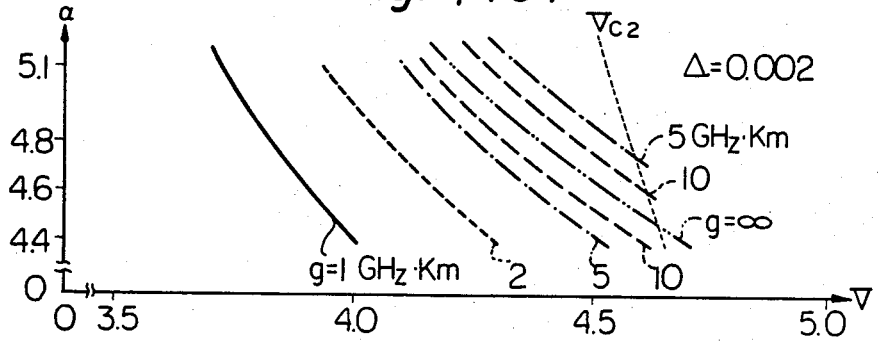

FIG. 3 shows the group delay $\tau_g$ vs the v value for both modes with $\alpha = 4.5$ and $y = 0$. It should be noted in FIG. 3, that the group delays of both modes coincide with each other at $v = 4.605$. This value of v ($=4.605$) is also the same as the cutoff frequency $v_{c2}$ of the second higher order mode. FIG. 3 assumes that the relative index difference $\Delta$ is costant and does not depend upon the wavelength. From the data analogous to FIG. 3, the range of the value (v) which satisfies the bandwidth larger than g ($GH_z.Km$) for the given values of $\alpha$ and $\Delta$ are shown in FIGS. 4(A), 4(B) and 4(C). FIG. 4(A) shows the case where $\Delta = 0.004$, FIG. 4(B) shows the case where $\Delta = 0.003$, and FIG. 4(C) shows the case where $\Delta = 0.002$. In those figures, the dotted line at the right side of the drawings shows the cutoff frequency $v_{c2}$ of the second higher order mode group ($LP_{11}$, that is $HE_{31}$ and $EH_{11}$ modes). It should be appreciated that the normalized frequency higher than the cutoff frequency $v_{c2}$ can not be utilized since the high order modes higher than second order are involved.

In FIGS. 4(A) through 4(C), the values v and $\alpha$ satisfying the desired bandwidth reside in the area surrounded by a pair of curves having the same value of g.

In order to obtain a wideband optical fiber whose refractive index distribution is defined by Eq. (4), for instance, to obtain the bandwidth of 10 $GH_z.Km$ when $\Delta = 0.003$, the combination of v and $\alpha$ can be allowed in the area surrounded by the long dashed lines indicated as $g = 10$ in FIG. 4(B). For instance when $\alpha = 4.5$, the range of the value v is $4.5 \leq v \leq 4.605$. Further, it should be appreciated that the larger value of v is preferable in order to obtain the larger core diameter. That is to say, the value v should be almost close to the cutoff frequency $v_{c2}$ of the second higher order mode on the condition that the value v is smaller than the cutoff frequency $v_{c2}$.

The allowable lower limit of the value $\alpha$ is determined taking into consideration the value $v_{c2}$, and is determined as $\alpha = 4.5$ in which the curve $v_{c2}$ crosses the curve $g = \infty$ in FIGS. 4(A) through 4(C). The curve $g = \infty$ means that the bandwidth is infinite, that is to say, the group delay difference $\tau_d = 0$.

On the other hand, the allowable upper limit of the value $\alpha$ is determined by the core radius taking into account the bending loss.

And said bending loss (the loss of optical power due to the pressure of a bend in an optical fiber) of a graded index optical fiber is the same as that of a step index optical fiber. On the condition of equal bending loss value, the relative index difference $\Delta$ in a graded index optical fiber corresponds to the relative index difference in a step index optical fiber as represented by the following approximate equation.

$$\Delta_e = (\alpha/(\alpha + 2)) \cdot \Delta. \quad (12)$$

Equation (12) shows that the relative index difference $\Delta$ in a graded index optical fiber must be larger than the value $\Delta_e$ in a step index optical fiber when the bending losses of both types of optical fibers are assumed to be equal. That is to say, the increase of the value v in a graded index optical fiber is not proportional to the increase of core diameter as long as the bending loss of a graded index optical fiber is assumed to be the same as that of a step index optical fiber.

Accordingly, we define a new normalized frequency $v_3$ which can indicated how much the core diameter of a graded index optical fiber is increased on the condition that the bending losses of the two optical fibers agree with.

$$v_e = v\sqrt{\Delta_e/\Delta} = v\sqrt{\alpha/(\alpha + 2)}. \quad (13)$$

From the above theory, the upper limit of the value $\alpha$ is determined to be 5.4 ($\alpha \leq 5.4$), assuming that the core diameter is increased to the value derived from 90% of the value $v_e$ for $\alpha = 4.5$. Said value $\alpha = 5.4$ is derived as follows; in FIG. 4(B) the crossing point of the curve $\alpha = 4.5$ and the curve $g = \infty$ shows the value $v = 4.61$. And next the crossing point of the $v = 4.04$ ($v_e = 3.83 \times 0.9 = 3.45$) and the curve $g = \infty$ shows the value $\alpha = 5.4$.

Accordingly, the range of the value $\alpha$ satisfies the inequality; $4.5 \leq \alpha \leq 5.4$.

The structure of an optical fiber is designed so that the range of $\alpha$ satisfies the above condition, and the value of $\Delta$ is within the allowable range for the selected value of $\alpha$. For instance, when $\alpha = 4.5$ and $v = 4.5$, the relative index difference $\Delta_e$ of the present optical fiber is approximately $\frac{2}{3}$ that of a prior graded index optical fiber. Assuming that the bending loss of the present optical fiber is the same as that of a prior step index optical fiber, the equivalent normalized frequency ($v\sqrt{\alpha/(\alpha+2)}$) which contributes to increase the core diameter of an optical fiber, becomes $v_e = 4.5 - 0 \times \sqrt{\frac{2}{3}} = 3.67$. This value (3.67) is almost 1.5 times as large as that of the maximum value $v = 2.405$ of a prior step index single-mode optical fiber. In summarizing, when the values of $\lambda$, n, and the equivalent value of $\Delta$ are predetermined, the resultant core diameter of the present optical fiber can be 1.5 times as large as that of a prior optical fiber.

FIG. 5 shows the refractive index distribution of the present optical fiber in which $\lambda = 1.25$ $\mu$m, n = 1.4521, $\Delta = 0.003 \pm 0.00015$, $\alpha = 4.45 \pm 0.11$, $14.94 \leq 2a \leq 16.54$ $\mu$m, and the external diameter $2b = (130 \pm 1)$ $\mu$m, are used. In FIG. 5, the abscissa shows the length from the core center, the ordinate shows the refractive index (n), and the shaded area shows the possible area where the bandwidth of, at least, 10 GHz.Km is attained.

It should be noted that the above explanation assumes that the value $\Delta$ is independent of the wavelength ($\lambda$). However, the value $\Delta$ depends, to a small degree, upon the wavelength. The change of the value $\Delta$ is expressed by the profile dispersion parameter (y) appearing in Eq. (5).

$$y = -(2n_0/n_g)(\lambda/\Delta)(d\Delta/d\lambda) \qquad (14)$$

where $n_g$ is the group index at the core center.

FIG. 6 shows the possible lower limit $\alpha_0$ of the value $\alpha$ and the value $v_0$ which is the value of v with $\alpha = \alpha_0$, when y is taken into account. It should be noted in FIG. 6 that the value $\alpha$ with $y = 0$ if of course $\alpha_0 = 4.5$. From FIG. 6, it is seen that the range of the value $\alpha_0$ is 3.2 through 6 when y changes from $-0.3$ to 0.3. The curve of FIG. 6 can be obtained through the same procedure as explained in accordance with FIGS. 4(A) through 4(C) assuming that the value of $\Delta$ is 0.2 through 0.3%.

FIG. 7 shows the apparatus for manufacturing the optical fiber of the present invention by the CVD method (Chemical Vapor Deposition, (U.S. Pat No. 3,711,262)). In FIG. 7, the reference numerals 11a and 11b are rotatable frames which are rotated by the motor 18. Between the frames a hollow tube 10 made of $SiO_2$ is mounted and rotates in the direction indicated by the arrow A. The slidable burner 12 moves in the horizontal direction along the screw 17 to heat the hollow tube 10. Some gases including, for instance, Ge, P, Al, or B are introduced into the hollow tube 10 through the tube 13, and the thin layer grows in the internal wall of the hollow tube. The grown internal layer operates, of course, as the core of an optical fiber. In the embodiment of FIG. 7, the gas introduced into the hollow tube is produced from $GeCl_4$, $O_2$, and $SiCl_4$. In FIG. 7, the reference numeral 14 shows the support for supporting the frames, the burner, the hollow tube, and the motor, the reference numeral 15 is a container for securing $SiCl_4$, and 16 is the other support for supporting the container 15. After the internal layer of the hollow tube has fully grown, the tube 10 is drawn to produce a thin, long optical fiber. By increasing the concentration of the dopant gradually, the refractive index of the central portion of the core is larger than that of the periphery portion. Accordingly, the desired refractive index distribution can be obtained by controlling the concentration of the dopant.

Further, another production method for optical fibers, such as VAD (Vapor Phase Axial Deposition U.S. Pat No. 4,062,665)) is also available for manufacturing the present optical fiber.

As explained above in detail, the present optical fiber has the structure that the power exponent $\alpha$ is designed to be within the range $3.2 \leq \alpha \leq 6.0$, and the value $\alpha$ and the normalized frequency (v) are designed so that the group delay of the fundamental mode ($LP_{01}$) is matched with that of the first higher order mode ($LP_{11}$). Therefore, the present optical fiber can provide a broad bandwidth, and a large core diameter, which can be almost 1.5 times as large as that of a prior step index single mode optical fiber. Accordingly, the larger axial misalignment can be permitted when the fiber is coupled to each other, or when the fiber is coupled into another optical device.

From the foregoing it will now be apparent that a new and improved optical fiber has been forund. It should be understood of course that the embodiments disclosed are merely illustrative and are not intended to limit the scope of the invention. Reference should be made to the appended claims, therefore, rather than the specification as indicating the scope of the invention.

What is claimed is:

1. A graded index optical fiber comprising a core and a cladding provided coaxially with said core whose refractive index distribution (n) at the radial length (r) from the core axis is given by $$n = \begin{cases} n_0(1 - \Delta(r/a)^\alpha), & 0 \leq r \leq a \\ n_0(1 - \Delta) = n_e, & r \geq a \end{cases}$$

where $n_0$ is the refractive index at the core center, (a) is the core radius, $\alpha$ is a power exponent, $\Delta = (n_0 - n_e)/n_e$, and $n_e$ is the refractive index of the cladding, said fiber is, characterized in that the value $\alpha$ and the normalized frequency $$v \left( = \frac{2\pi a n_0}{\lambda} \sqrt{2\Delta} \right., \lambda \text{ is the wavelength})$$

are designed so that the group delay of the fundamental mode is equal to that of the first higher order mode.

2. The invention as defined in claim 1, wherein the value $\alpha$ is equal to or larger than 3.2.

3. The invention as defined in claim 2, wherein the value $\alpha$ is equal to or larger than 4.5.

4. The invention as defined in claim 2, wherein the value $\alpha$ is equal to or less than 6.0.

5. The invention as defined in claim 3, wherein the value $\alpha$ is equal to or less than 5.4.

6. The invention as claimed in claim 1, wherein the value $\alpha$ is within the range of 3.2 through 6.0.

* * * * *